United States Patent

Orr et al.

[11] Patent Number: 6,078,423
[45] Date of Patent: Jun. 20, 2000

[54] STEREOSCOPIC DISPLAY DEVICE

[75] Inventors: Edwina Margaret Orr; David John Trayner, both of London, United Kingdom

[73] Assignee: Richmond Holographic Research & Development Limited, United Kingdom

[21] Appl. No.: 08/973,516

[22] PCT Filed: Jun. 7, 1997

[86] PCT No.: PCT/GB96/01378

§ 371 Date: Feb. 23, 1998

§ 102(e) Date: Feb. 23, 1998

[87] PCT Pub. No.: WO96/41228

PCT Pub. Date: Dec. 19, 1996

[30] Foreign Application Priority Data

Jun. 7, 1995 [GB] United Kingdom ............... 9511519

[51] Int. Cl.[7] ............................ G02B 27/22; G02B 5/32
[52] U.S. Cl. .................... 359/462; 359/466; 359/475; 359/15
[58] Field of Search ............................ 359/466, 462, 359/464, 471, 475, 477, 15

[56] References Cited

U.S. PATENT DOCUMENTS

| | | |
|---|---|---|
| 3,447,854 | 6/1969 | Minter ............................ 359/464 |
| 3,802,769 | 4/1974 | Rotz et al. . |
| 4,535,354 | 8/1985 | Rickert . |
| 4,799,739 | 1/1989 | Newswanger . |
| 5,379,133 | 1/1995 | Kirk . |
| 5,418,584 | 5/1995 | Larson . |
| 5,703,717 | 12/1997 | Ezra et al. ............................ 359/462 |

FOREIGN PATENT DOCUMENTS

| | | |
|---|---|---|
| 0 654 951 | 5/1995 | European Pat. Off. . |
| 91/02278 | 2/1991 | WIPO . |
| 93/02372 | 2/1993 | WIPO . |
| 94/20874 | 9/1994 | WIPO . |

*Primary Examiner*—Jon Henry
*Attorney, Agent, or Firm*—Townsend and Townsend and Crew LLP

[57] ABSTRACT

A display device includes an image bearing device for generating one or more viewable images, optical elements for generating one or more viewing zones for viewing the viewable images, and an optical element with positive optical power. The elements are arranged and constructed such that the optical element with positive optical power forms a real image of the or each viewing zone and a virtual image of the or each viewable image, whereby the or each virtual image is visible to a viewer only when a light ray can be traced from the viewer's eye through the real image of an associated viewing zone, the optical element and the viewable image. The display may be an autostereoscopic display.

19 Claims, 11 Drawing Sheets fig. 1A.

STEREOSCOPIC DISPLAY DEVICE

The present invention relates to a stereoscopic display device.

Many stereoscopic displays are known, there is a growing class of displays which provide for the viewing of stereoscopic images without the use of special viewing aids, these are known as autostereoscopic displays. They are all characterised by the use of some view determining means whereby each of the viewer's two eyes see a different image on a screen.

In a stereoscopic image two 2D images are used (we will call them half images) taken together they are known as a stereo pair. The stereoscopic effect is produced by the difference in perspective of the two half images. Each half image is formed at a certain distance from the viewer and the viewer's eyes will focus on the image. The eye's accommodation is one of the many visual cues interpreted by the brain to give depth information. As the eyes focus on the 2D half image any difference in depth sensation provided by the stereoscopic effect will contradict the depth information provided by accommodation. In practice it is necessary to restrict this conflict, otherwise viewer discomfort and eyestrain will occur. Autostereoscopic displays generally form their half pictures on the plane of a viewing screen. The size of the screen is usually severely limited by a number of factors and to minimise the conflict between accommodation and stereoscopy the 3D image needs to be formed close to the display screen.

It is an obvious characteristic of any three dimensional imaging system that images appear at a definite distance from the viewer.

A consequence of this is that the size of the 3D image is also determinable and clearly observable. (This may be contrasted with a 2D picture where no depth information is present so a large object will appear to be a large object even if the size of the image is small.)

As a consequence of the above existing autostereoscopic displays are incapable of displaying fullsize images of anything larger than the display screen itself; any larger objects must be displayed at a small scale and (unlike 2D images) will appear to be objectively small.

This fact limits the useability of existing autostereoscopic displays as the increased naturalism of the 3D image is compromised by the unrealistic representation of scale.

In accordance with the present invention there is provided a stereoscopic display device comprising:

(a) means for generating a plurality of viewable images, each viewable image comprising a different perspective view of a common scene;

(b) means for generating a plurality of viewing zones for viewing the viewable image(s), the viewing zones being so arranged such that in use each of a viewer's eyes sees different viewable images thereby enabling the viewer to enjoy a stereoscopic 3D image of the common scene; and (c) an optical element with positive optical power;

wherein elements (a)–(c) are arranged and constructed such that the optical element forms a real image of the viewing zones and a virtual image of the viewable images whereby the or each virtual image is visible to a viewer only where a light ray can be traced from the viewer's eye through the real image of an associated viewing zone, the optical element and the viewable image, and wherein the means for generating a plurality of viewable images comprises image bearing means which lies between the optical element and the back focal point of the optical element.

The present invention allows the formation of the viewable image(s) at an arbitrary distance from the viewer and of an arbitrary size which is not limited by the size of the display itself.

A convenient analogy is a window: a very large scene can be seen through a small window. In the present invention, a large scene may be seen as if though the display window.

This invention provides a means whereby three dimensional images may be seen without the use of glasses, head mounted displays or similar inconvenient viewing aids, it also provides for the viewing of images which may be substantially larger than the display itself.

The image bearing means may be an— LCD, or a screen (which may be a holographic optical element) onto which the viewable image is projected.

Figure 1:
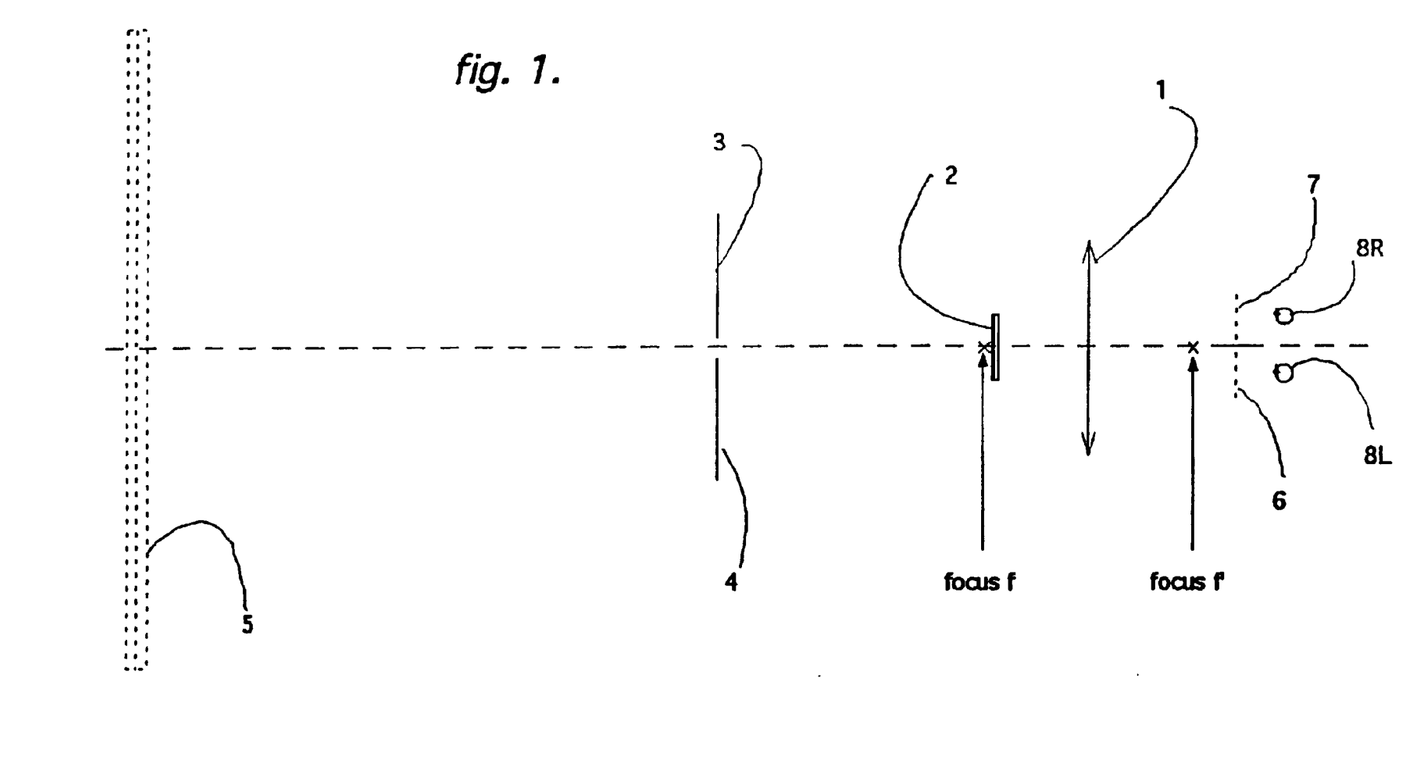
FIG. 1 shows a generalised arrangement of a display according to the present invention.

A number of embodiments of the present invention will now be described with reference to the accompanying Figures, in which:

FIG. 1 shows a generalised arrangement of a display according to the invention.

The display comprises an image bearing device 2 which generates a pair of superimposed real 2D half images (referred to hereinafter as 2*l*,2*r*—not shown). The image bearing device 2 lies between the back focal point of a focusing optic 1 (with positive optical power) and the optic itself. The two half pictures 2*l*,2*r* are provided with view determining apertures 3,4 respectively by means not shown.

The effect of this arrangement is that the superimposed half images 2*l*,2*r* form as an enlarged virtual image 5 while the view determining apertures 3,4, form as real images 6,7 respectively.

The viewer is positioned such that the left and right eyes 8*l*,8*r* are located roughly as indicated.

Both eyes focus on the image 5 of the stereo pair 2. It will be remembered that both half images 2*l*,2*r* are superimposed so their respective images 5*l*,5*r* will also be superimposed.

Images 6,7 of the view determining apertures 3,4 form real images as indicated, these images 6,7 determine respectively the zones whence the images 5*l*,5*r* of each half picture 2*l*,2*r* may be seen.

For convenience we will now call images 6,7 viewing apertures.

In FIG. 1 we illustrate a simple case where viewing apertures 6,7 are conveniently located such that the left eye 81 observes the enlarged left half image 51 through aperture 6 and the right eye observes the enlarged right half image 5r through aperture 7.

Clearly the size of the image 5 of stereo pair 2 can be substantially larger than the diameter of the optic 1, the stereoscopic image can be located in the general location of the virtual image 5 thereby achieving our goal of providing a relatively small autostereoscopic display which displays large 3D without introducing unacceptable depth cue conflicts between accommodation and stereopsis.

Figure 1A:
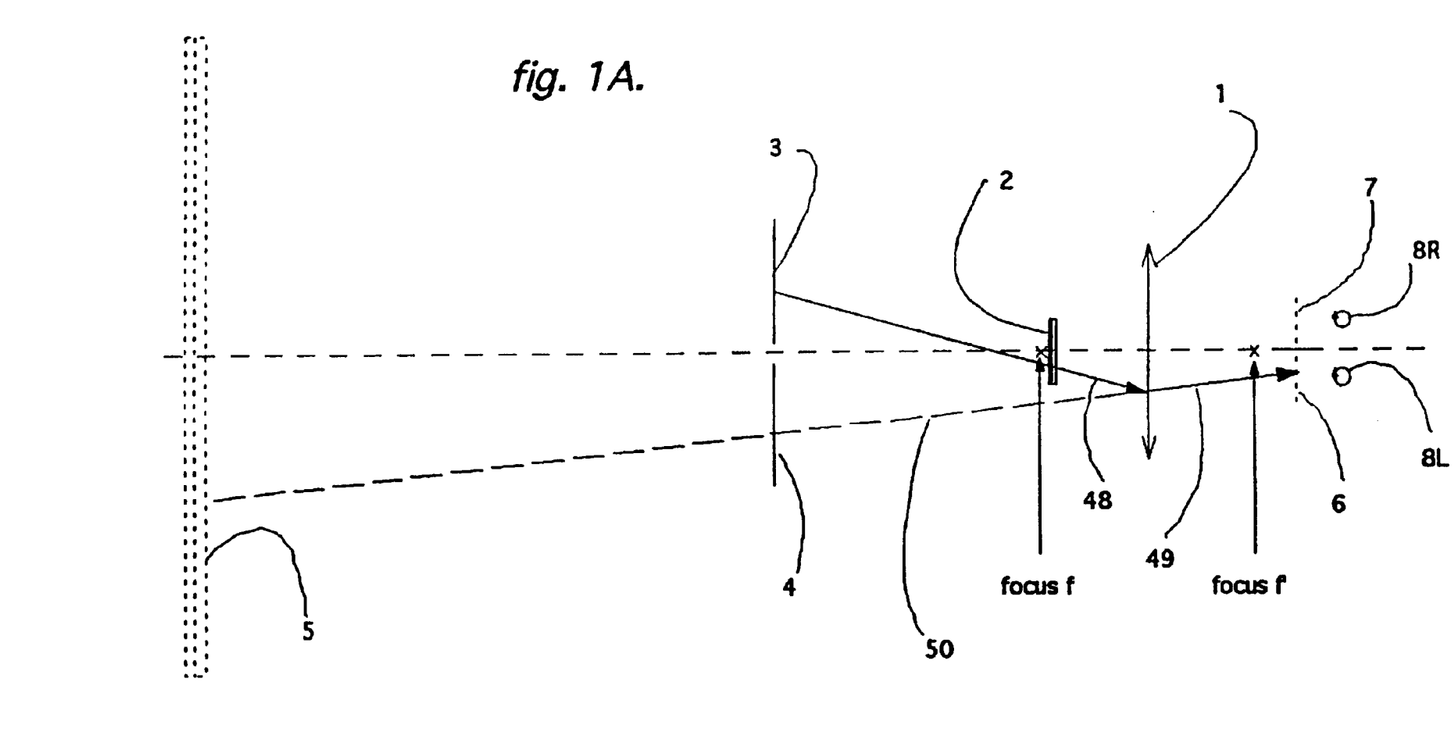
FIG. 1A shows a pair of example rays in the arrangement of FIG. 1.

FIG. 1A shows the arrangement of FIG. 1 with a number of example rays added.

Consider rays 48–50. In the absence of focusing optic 1, the viewer would imagine a ray of light from the virtual image 3 of the left-hand viewing zone. Ray 48 passes through the 2D image 2 towards the optic 1 where it is bent becoming ray 49 which to the eye appear to emanate from image 5 as indicated by ray 50. Note that the optic 1 makes real images (6,7) of the diffuse zones (3,4) as well as a virtual image 5 of the 2D display means 2. As a consequence of the light illuminating the left half image is the same as the light forming real image 6 of diffuse zone 3 so the left half image will only be visible if light rays such as 48–50 can be traced through the eye 81, the viewing zone real image 6 and the optic 1. The same applies to the right eye and its associated images. Note that as drawn the right eye cannot see any of the light that is directed towards the left viewing zone 6 (the same applies obviously to what the left eye can see). Consequently each eye sees a different 2D image at 5.

Figure 1B:
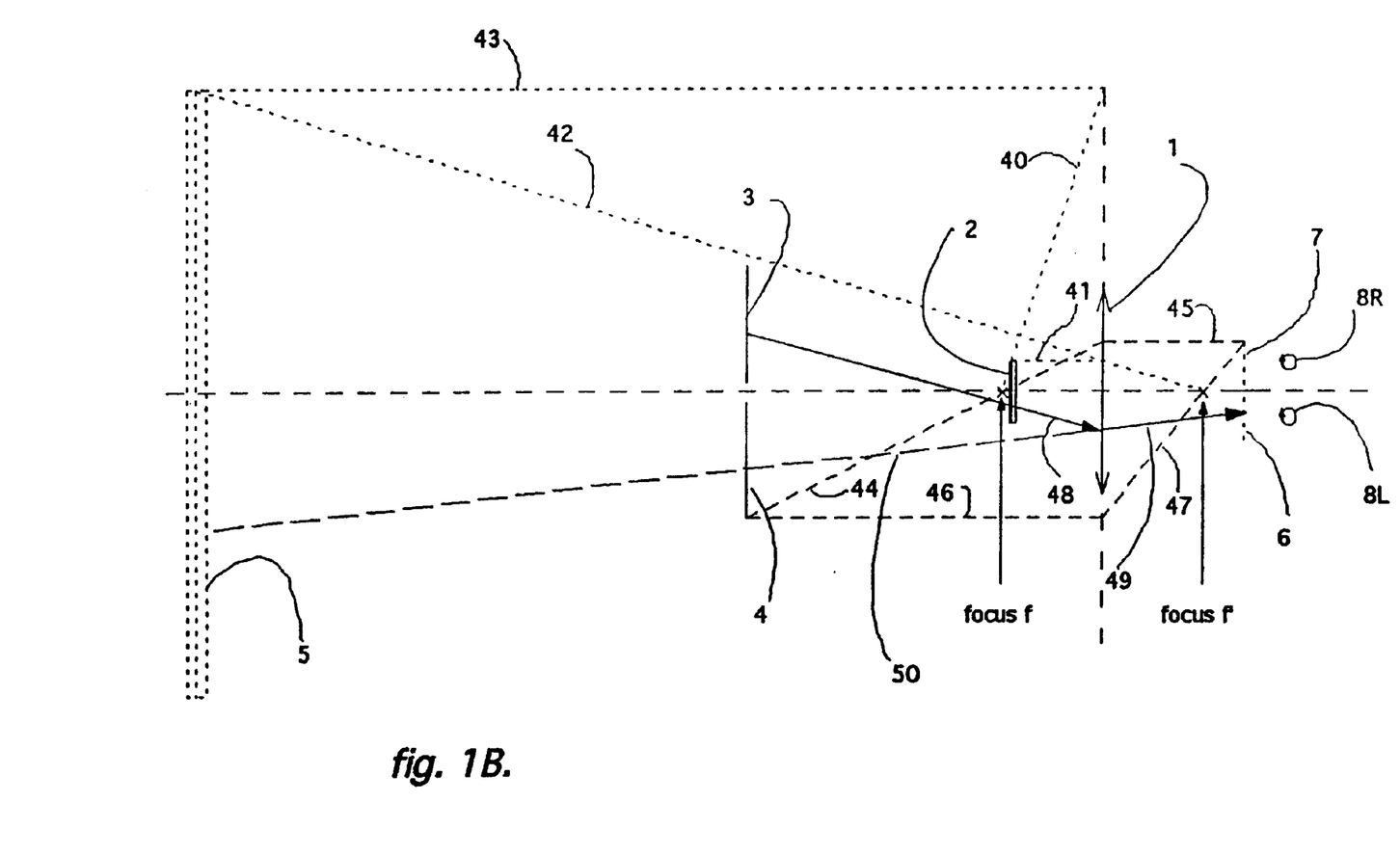
FIG. 1B illustrates the construction lines used in the construction of the real and virtual images in FIG. 1.

FIG. 1B shows a number of construction lines used in the construction of the real and virtual images of FIG. 1. The lines 40–43 with short dashes are rays used in the construction of the virtual image 5. The lines 44–47 with medium dashes are used in the construction of the real image viewing zones 6,7.

We will now describe some practical configurations.

Optic 1 can be a lens or lens combination. It can be a mirror or mirror combination, it can be a holographic/diffractive optical element or combination of such elements. It may also be a combination of different types of element, e.g. lens and mirror.

It is likely that the optic 1 will operate off-axis, it might also be advantageous for there to be some minor aberrations introduced by the optic 1 to blur the images of pixels and thereby to provide a more homogeneous picture.

Turning to the stereo pair display 2 and the zones 3,4. There are a number of ways to achieve this optically.

Firstly the stereo pair 2l,2r may be provided by projection onto a holographic screen.

Figure 2:
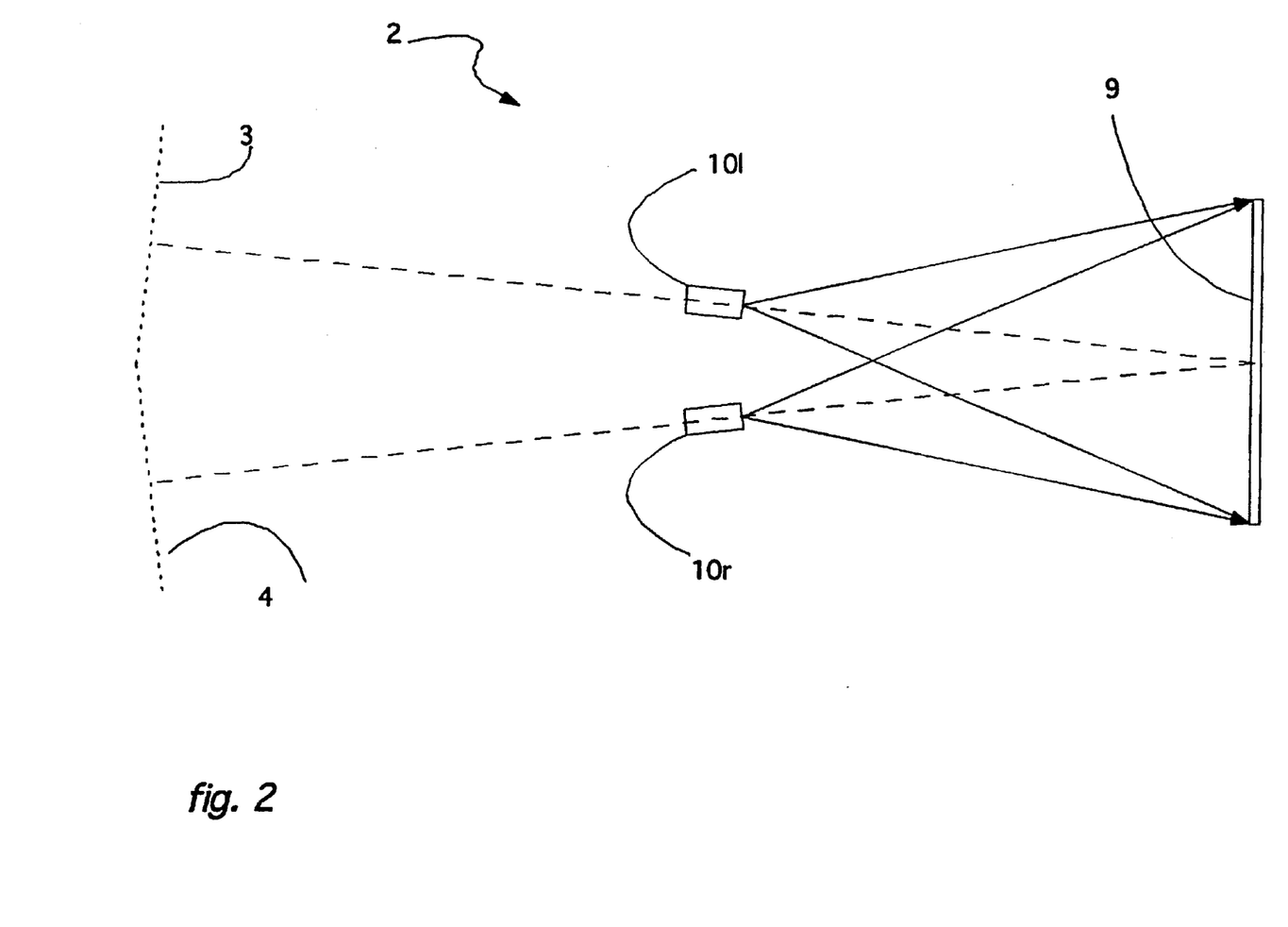
FIG. 2 is a schematic plan view of part of a practical display device.

Referring to FIG. 2 which is a plan view and not to scale. We have the stereo pair 2 provided by a pair of projectors 10l and 10r projecting respectively left and right half images onto holographic element 9. The Holographic elements 9 reconstructs an even diffuse zone when illuminated by a correctly positioned light source, the projector 10l may be considered a light source and will reconstruct the diffuse zone 3, projector 10r acts in a similar way and reconstructs a diffuse zone 4, the displacement between zones 3 and 4 is caused by the displacement between projectors 10l and 10r. Zones 3 and 4 can be reconstructed at infinity or as virtual images or as real images.

Figure 3:
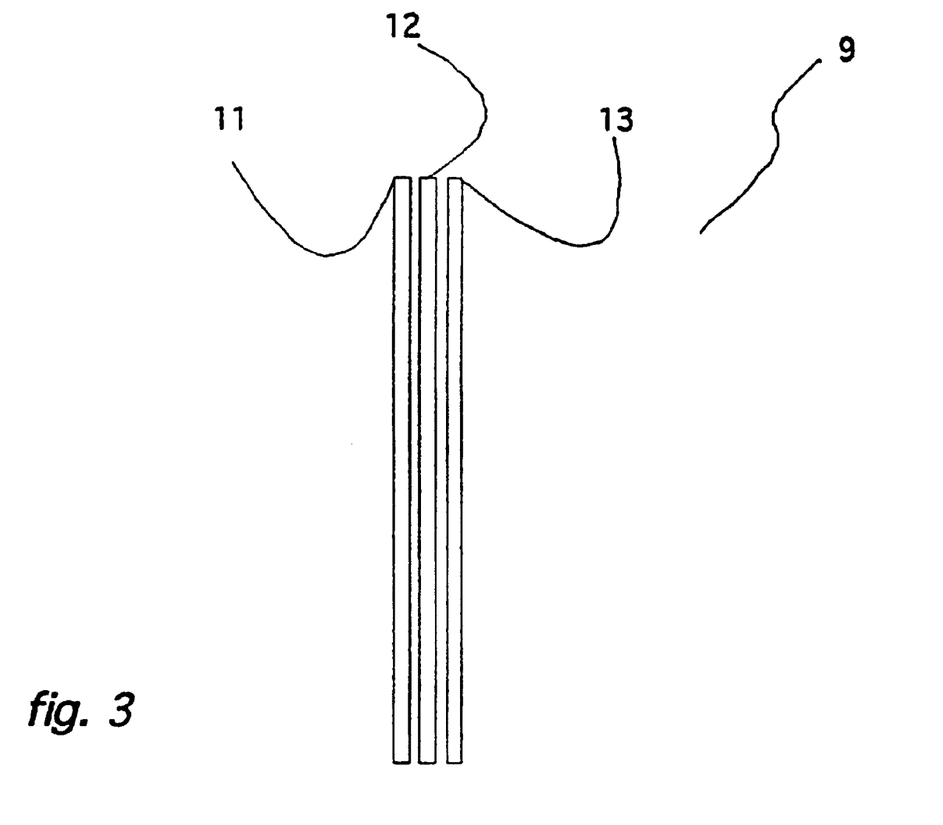
FIG. 3 is a schematic diagram of an alternative composite holographic optical element.

The holographic element 9 can be a simple transmission hologram or a reflection hologram, it can also be advantageously constructed as illustrated in FIG. 3 where it is composed of a diffraction grating 11, a louvred screen 12 and the holographic recording 13 of the diffuse zone, this configuration provides dispersion compensation. The aggregate optical power of the grating 11 and hologram 13 should be near zero and they are made so that the grating 11 and hologram 13 provide equal and opposite dispersion, with this particular configuration the optic 1 may be placed in contact with the hologram or hologram combination 9, either between it and the projectors 10 or on the other face between it and the viewing position. This represent a limiting case where no image magnification occurs but where the zones 3,4 are imaged as real images 6 and 7 as per FIG. 1. If there is a separation between the hologram screen 9 and the lens 1 (and where the lens is between the screen 9 and the viewer) then image magnification will occur as described previously.

If dispersion compensation is not used then the zones 3,4, would be advantageously inclined at the achromatic angle so as to facilitate good colour rendition.

(It is also possible to provide three projectors at 10l, each of the three will project one colour separation and the projectors will be positioned so the differently coloured zones 3 overlap, the same arrangement would be used for projector 10r.)

Secondly, the stereo pair 2l,2r may be provided by a single transmissive image element and a single hologram.

Figure 4:
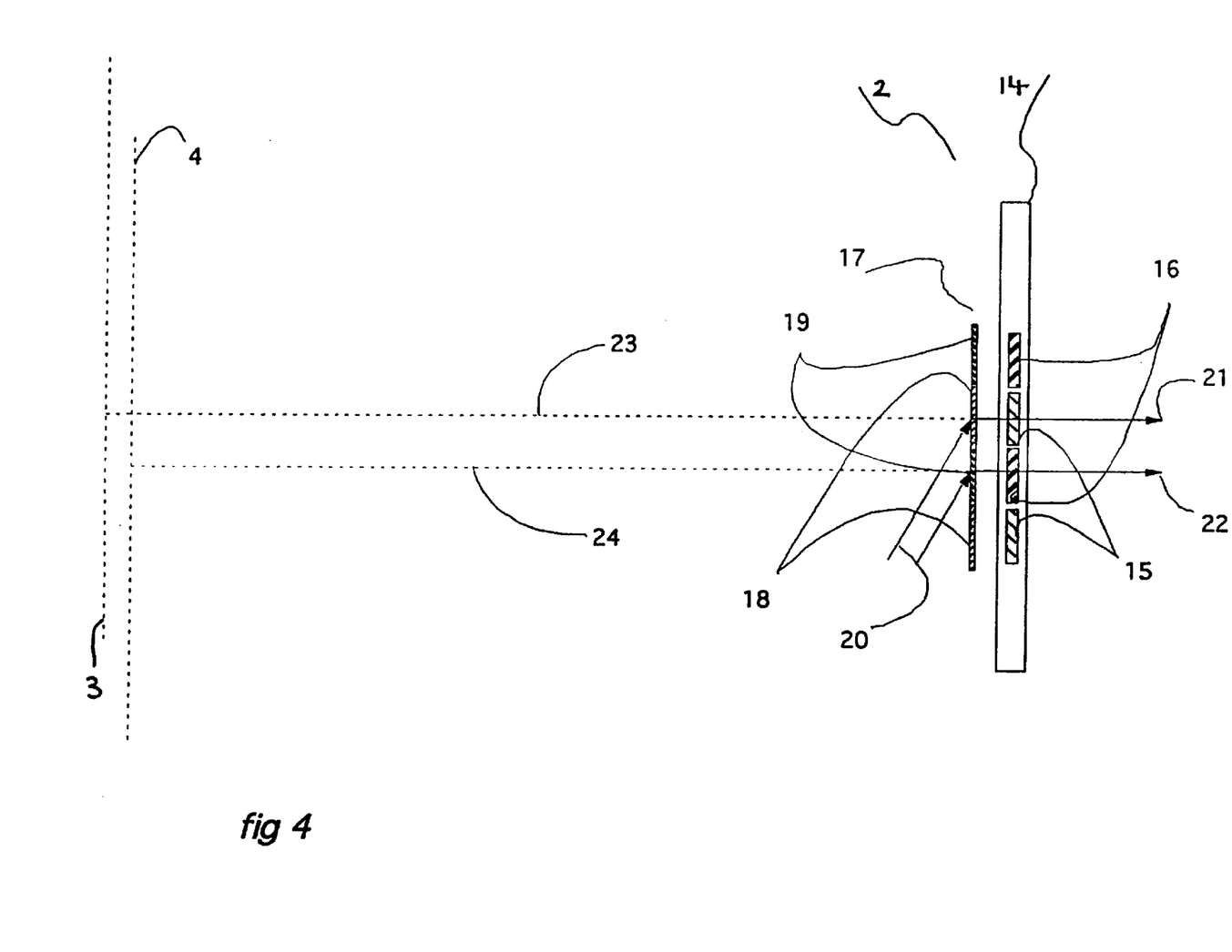
FIG. 4 shows part of an alternative display device incorporating a liquid crystal display.

In this embodiment the stereoscopic pair 2 and zones 3,4 are generated by a combination of a light source, a hologram and a transmissive image bearing panel which can be a LCD and will be described as such in the following.

Referring to FIG. 4 which is a schematic vertical section and not to scale.

LCD 14 is considered as being composed of two sets of pixels 15 and 16 (only two of each are shown in the figure). Pixels 15 display the left stereo half image between them and pixels 16 the right stereo half image. A hologram 17 is set next to the LCD (in the case shown it is behind, it can be in front). The hologram 17 is composed of two sets of elements 18,19 which may or may not overlap, it is illuminated by a beam of light 20. We have illustrated some rays of light for the purpose of explanation, clearly there are many more rays that could be drawn which are not necessarily parallel to the illustrated ones.

Part of light 20 strikes hologram element 18 where it reconstructs the image 3 of a diffuse area of light, in the illustrated case this is a virtual image where diffracted ray 21 appears to originate from image 3. It will be noticed that diffracted ray 21 passes through a member of pixel set 15. The hologram and LCD are arranged such that the light diffracted by all the members of the set of hologram elements 18 pass through members of the pixel set 15 and not through any members of set 16. The light 21 is modulated by the image displayed by pixel set 15. The same occurs mutatis mutandis in the case of hologram element set 19, image 4, rays 22 and pixel set 16.

The two virtual images 3,4 are of evenly illuminated diffuse zones of light, they are advantageously co-planar and abut each other side to side with neither overlap nor gap between them. (The figure is a vertical section and distorted slightly for clarity so this is not shown precisely.)

When combined with the optical element 1 the zones 3,4, are re-imaged as real images 6,7 forming the left and right viewing zones respectively.

Figure 5:
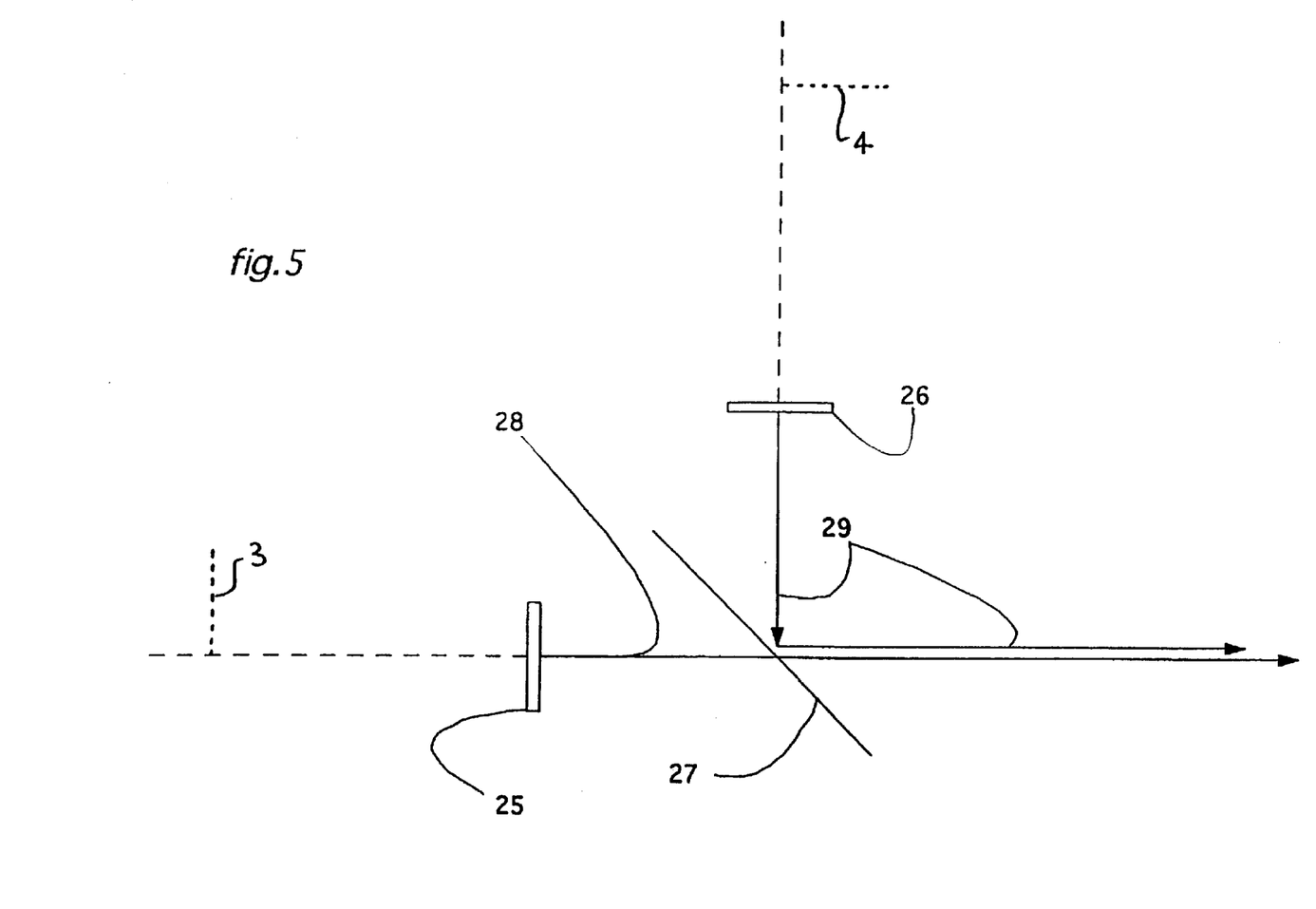
FIG. 5 illustrates part of a further alternative embodiment.

Thirdly, the stereo pair 2l,2r may be formed by two separate LCDs and a beamsplitter. Stereo pair 2 can be the optical image of one or both of the stereo half images. There are a number of optical methods to overlap one image on another, we will describe a simple one which makes use of a beamsplitter.

Referring to FIG. 5, the left half image is displayed on transmissive display 25, it is illuminated in such a way that the light passing through it originates from or appears to originate from the diffuse zone 3. One way of achieving this is to use a holographic element to illuminate the half image 25, which is particularly advantageous if the optical design of the whole display means that the diffuse zone 3 should be at a great distance or if it should be a real, rather than virtual, image. Light 28 has passed through the half image and then passes through beamsplitter 27 on towards optic 1. The right half image is displayed and illuminated in the same way with the sole difference that the light 29 is reflected from the beamsplitter 27 such that the image of half image 26 is superimposed upon half image 25 and the zone 4 appears adjacent to zone 3. Once reflected, light 29 continues parallel to light 28 on towards the optic 1.

The above are some of the ways that the stereo pair 2 and zones 3,4, may be disposed for the proper functioning of the displays. There are some other approaches which can be made to work through the use of micro lens arrays, prism arrays, time sequential display.

We will now look more closely at the operation and construction of the optic 1.

The use of a holographic optical element in this situation is attractive as such elements can appear a clear flat pieces of glass, allowing the viewer to see through them, the stereoscopic image can thereby appear to superimpose itself on the real scene seen through the optic 1.

Figure 6:
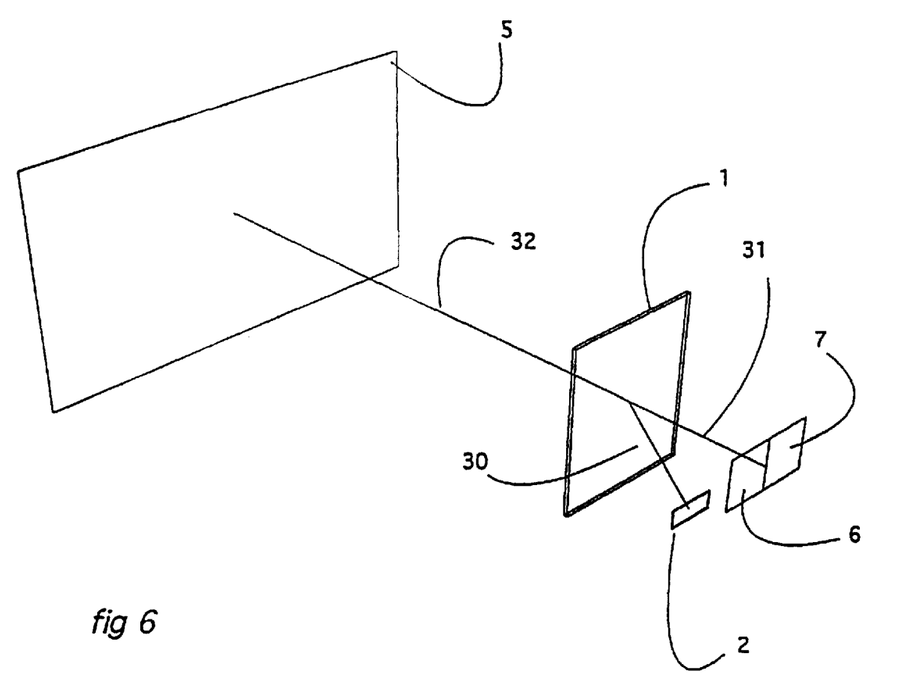
FIG. 6 is a schematic illustration of a further alternative embodiment of the present invention.

FIG. 6 shows a view of one such arrangement.

Stereo pair 2 is illuminated such that light 30 passing through the stereo pair 2 is focused by reflection Holographic Optical Element (HOE) 1 the focused light 31 travels towards the viewer and forms diffuse real images 7 and 6 of the diffuse zones 3,4 (not shown) illuminating the two stereo half pictures. Light 31 appear to be the continuation of non-existing light 32 apparently emanating from the enlarged virtual image 5 of stereo pair 2.

For full colour operation HOE 1 should be a full colour reflection hologram made so that it reflects the primary colours used in the stereo pair 2.

A similar arrangement can be made using a transmission HOE though it this case additional filtering of the light (or use of monochromatic light sources) may be required to obtain a sharp image.

A mirror can be used in place of the HOE 1 in FIG. 6. Ideally this should be an off axis parabolic mirror, though other shapes would also work well enough.

A lens (or combination of lenses) can be used when the stereo pair 2 is on the opposite side of the optic 1 in FIG. 6. If a lens is used the configuration can obviously work on axis.

It may be advantageous to use compound optics which may be a combination of several optics of similar type (e.g. all lenses) or a different types (e.g. lenses, mirrors and/or diffractive elements).

With a practical display of the type described it might be desirable to allow the viewer to move without losing sight of the images or the stereoscopic effect. It can also be desirable to allow more than one viewer to enjoy the stereoscopic image at the same time. The precise methods of achieving these objectives depend on how the viewing zones 3,4 are formed. General methods are as follows:

Multiple view solution: If, instead of providing just two images for the stereo effect, we provide multiple viewpoints arranged so that the viewing zone corresponding to each image forms abutting its neighbour then a mobile viewer's eyes will move through successive viewing zones. At any position (within limits) each eye will see a different image. It is easy to see that this will provide the impression of parallax. Within the limits imposed by the construction of the display the viewer will be able to look around the apparent 3D image. Equally, two (or more) viewers will be looking through different viewing zones and will see the apparent 3D image from different perspectives.

However such a solution might be unattractive in that the resolution and bandwidth requirements are high. Human factors research shows that dozens if not hundreds of such 2D perspectives are required to generate a smooth effect.

Figure 7:
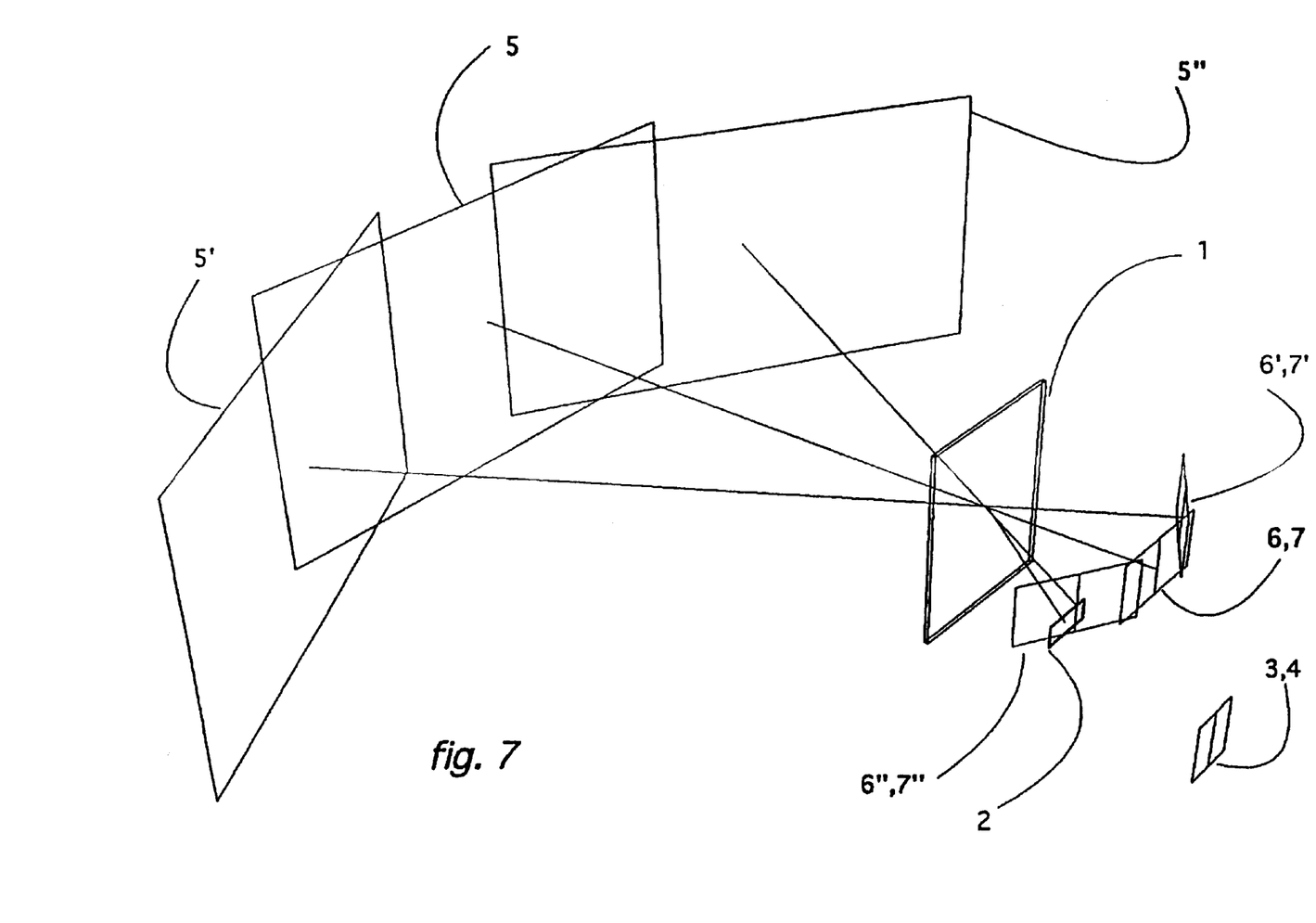
FIG. 7 is a schematic illustration of a further alternative embodiment in which the HOE is made with multiple focal points.

Mobile viewing zone solution: In order to avoid the requirement of high resolution imposed by a multiple view solution the display can be made with just left and right viewing zones and a means can be provided for moving the position of zones 3 and 4 in response to the viewer's own change of position. This will usually mean moving the illuminating light source (e.g. the position of the source of light 20 in FIG. 4 or the projectors in 10*l*, 10*r* in FIG. 2). This will allow the viewer to move without loss of 3D effect, if the perspectives of the stereo half images are also changed accordingly then the effect of continuous parallax can be achieved. If the display has to be used by more than one viewer at a time then we need to provide viewing zones 6,7 for each viewer, this means that a corresponding plurality of diffuse zone pairs 3,4 also need to be provided. Again the method of providing them depends on the way they are generated. The following are viable methods:

The optical element 1 can be made as an HOE with multiple focal points, thereby generating multiple viewing positions. This is illustrated in FIG. 7 where the holographic optical element is made with three foci. (E.g. by providing three object beams and one reference beam). The approximate location of the initial viewing zones 3,4 is illustrated (but note that they are virtual images). The optic 2 produces three sets of images. Three virtual images 5,5',5" are produced of 2, these are viewable through the associated real imaged viewing zones 6,7; 6'7';6",7", corresponding to three separate viewing positions.

Figure 8:
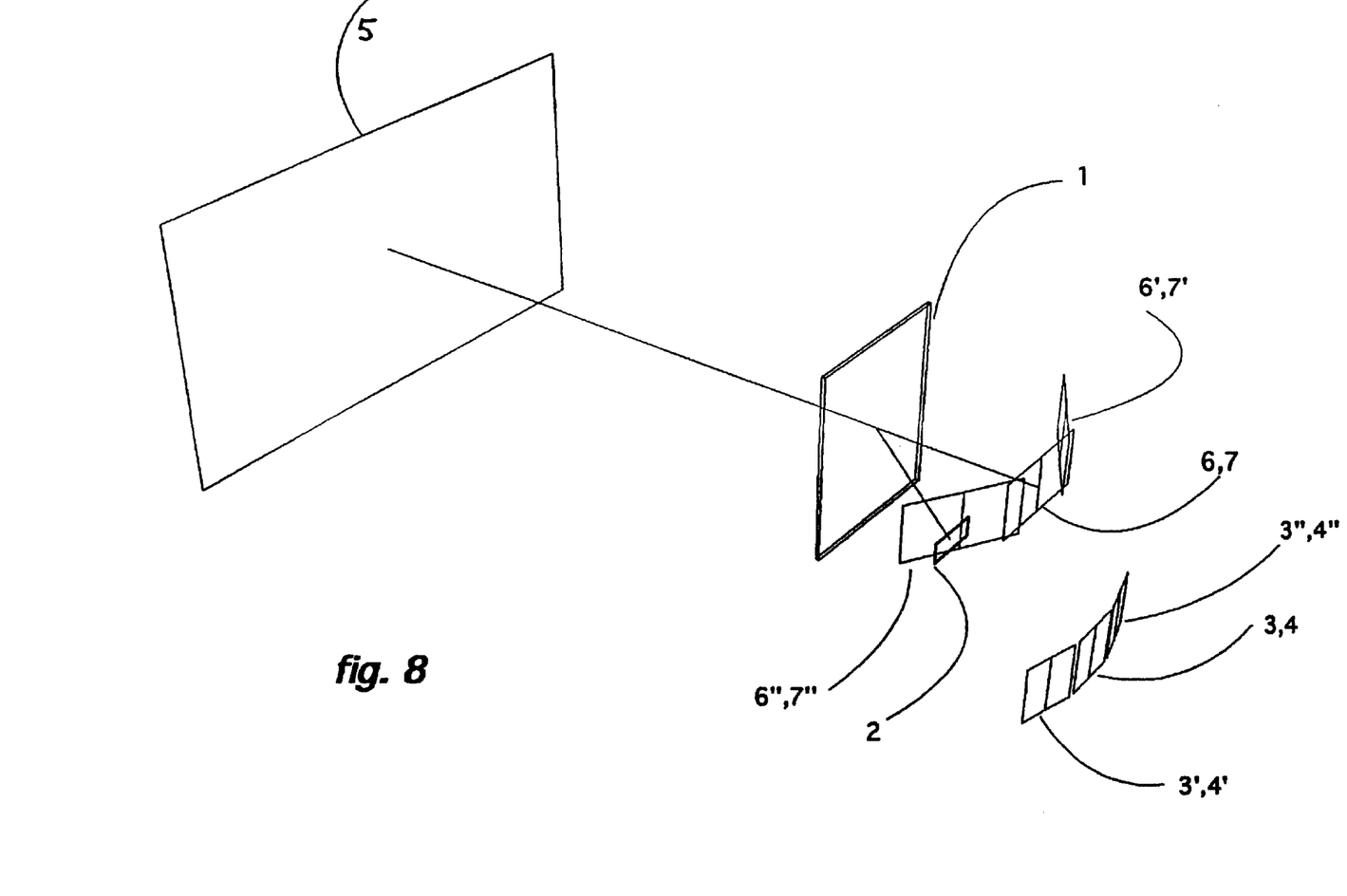
FIG. 8 is a schematic illustration of a further alternative embodiment in which the HOE has one focus and generates three pairs of viewing zones.

The holographic element(s) used to generate the diffuse zones 3,4, can be made to generate multiple viewing zone pairs 3,4; 3',4'; 3",4" etc. Corresponding to viewing zone pairs 6,7; 6',7'; 6",7" etc. As illustrated in FIG. 8, the optical element in this case has only one focus. Three viewing zone pairs 3,4; 3,4'; 3",4" have been illustrated, their number and relative position are determined by the optical element associated with image bearing means 2. They are imaged by the optic 1 so as to form real images 6,7; 6',7'; 6",7", thereby providing three viewing positions.

Figure 9:
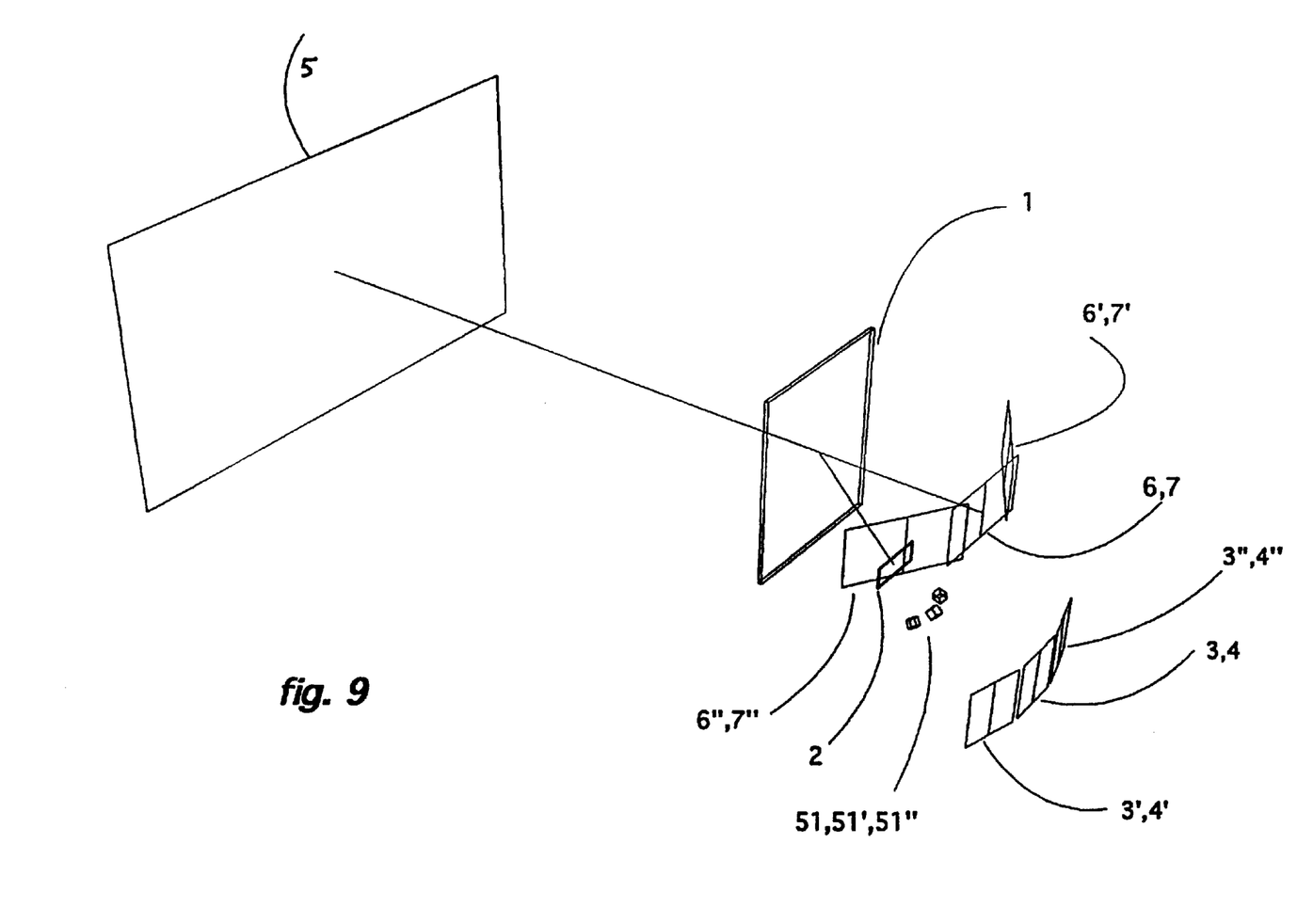
FIG. 9 is a schematic illustration of a further alternative embodiment where three lights are used.

Multiple diffuse zones 3,4 can be generated by using multiple light source in different positions, each one of which generates its own diffuse zone pair 3,4 which in turn are imaged as viewing zone pairs 6,7; 6',7'; 6",7" etc. as illustrated in FIG. 9 where three lights 51,51',51" are shown. The optical element in this case has only one focus and the number and position of the viewing zones corresponds to the number and position of the lights 51 etc. Such a configuration allows the moving of the viewing zones 3,4 by moving the position of the light 51, alternatively the use of several lights simultaneously will provide corresponding viewing zones 3,4 etc. simultaneously for a corresponding number of viewers. This solution can be combined with the mobile viewing zone method described above to enable the independent tracking of several viewers.

FIGS. 7, 8 and 9 show ways of achieving multiple and or mobile viewing zones in one embodiment of the invention. Similar methods can be applied to other embodiments.

What is claimed is:

1. A stereoscopic display device comprising:
   (a) means for generating a plurality of viewable images, each viewable image comprising a different perspective view of a common scene;
   (b) means for generating a plurality of viewing zones for viewing said viewable images, said viewing zones being so arranged such that in use each of a viewer's eyes sees different viewable images thereby enabling said viewer to enjoy a stereoscopic 3D image of said common scene; and
   (c) an optical element with positive optical power; wherein elements (a)–(c) are arranged and constructed such that said optical element forms a real image of said viewing zones and a virtual image of said viewable images whereby each virtual image is visible to said viewer only where a light ray can be traced from said viewer's eye through said real image of an associated viewing zone, said optical element and said viewable image, and wherein said means for generating a plurality of viewable images comprises image bearing means which lies between said optical element and the back focal point of said optical element.

2. A display device according to claim 1, wherein said viewable images are displayed on said image bearing means such that parts of said image bearing means display one image and other parts other images, further characterised in that said image bearing means is combined with a viewing zone determining optical device whereby the light passing through said parts displaying one image form a viewing zone remote from said image bearing means and light passing through said parts displaying other images also form remote viewing zones such that each respective viewing zone forms in a different position with respect to the other viewing zone(s).

3. A display device according to claim 1, wherein said viewable images are formed by separate image bearing means and wherein said images are projected onto a view determining screen such that the viewing zone associated with each image forms in a different position to said viewing zones associated with each other image.

4. A display device according to claim 1, wherein said means for generating a plurality of viewing zones composes an array of lenses.

5. A display device according to claim 1, wherein said means for generating a plurality of viewing zones comprises a holographic optical element which produces diffuse viewing zones either as real images or as virtual images.

6. A display device according to claim 3, wherein said view determining screen comprises a holographic optical element which produces diffuse viewing zones combined with a diffraction grating so as to effect dispersion compensation.

7. A display device according to claim 1, wherein said viewable images are formed by separate image bearing means and a further optical means disposed to overlay said image bearing means so that they appear both to be located in the same position.

8. A display device according to claim 7, wherein each image bearing means is associated with an additional viewing zone determining optical device, such that each viewing zone maybe a real image or a virtual image.

9. A display device according to claim 8, wherein said viewing zone determining optical devices comprise holographic optical elements which produce diffuse images such that in use said viewing zones associated with each viewable image form in different positions.

10. A display device according to claim 1, wherein said viewing zone generating means comprises a holographic optical element which forms the respective viewing zones as diffuse virtual images.

11. A display device according to claim 1, wherein said viewing zone generating means comprises a holographic optical element which forms the respective viewing zones as diffuse real images.

12. A display device according to claim 1, wherein said means for generating the viewable images generates the viewable images sequentially.

13. A display device according to claim 12, wherein said viewable images are displayed on said image bearing means and said image bearing means is combined with an optical element which forms a viewing zone remote from said image bearing means; the position of said viewing zone being dependant upon the position of a source of light illuminating said optical element whereby there is provided at least one light source for each separate viewable image and viewing zone required, the arrangement being such that when one viewable image is displayed then said illuminating light causes said viewing zone to form in one position and when a second viewable image is displayed a different light illuminates said optical element causing a second viewing zone to form in a different position, the sequential display of successive images and the associated forming of viewing zones being achieved fast enough for persistence of vision to prevent said viewer from perceiving the flickering of any of said images.

14. A display device according to claim 1, whereby said means for generating a plurality of viewable images comprises at least one liquid crystal display.

15. A display device according to claim 1, further comprising a light source for illuminating said image bearing means, wherein the position of said light source can be altered so as to move the position of said viewing zones in use.

16. A display device according to claim 15, wherein said light source moves in a manner such that said viewing zones move to follow the movement of said viewer's head so that said viewer can move without losing the stereoscopic effect.

17. A display device according to claim 1, wherein each viewable image is associated with more than one viewing zone thereby permitting more than one viewer to use the display at any one time.

18. A display device according to claim 1, wherein said optical element is a reflection or transmission Holographic Optical Element (HOE), a lens or a mirror or any combination thereof.

19. The display device according to claim 7, wherein said further optical means comprises a beamsplitter.

* * * * *

UNITED STATES PATENT AND TRADEMARK OFFICE
CERTIFICATE OF CORRECTION

PATENT NO. : 6,078,423
DATED : June 20, 2000
INVENTOR(S) : Edwina Margaret Orr, David John Trayner

It is certified that error appears in the above-identified patent and that said Letters Patent is hereby corrected as shown below:

Title page, item [22] PCT Filed: Jun. 7, 1996

Signed and Sealed this

First Day of May, 2001

Attest:

NICHOLAS P. GODICI

*Attesting Officer*      *Acting Director of the United States Patent and Trademark Office*